March 15, 1932.　　　F. FRASER　　　1,849,796
PROCESS AND APPARATUS FOR PRODUCING SHEET GLASS
Filed May 31, 1930
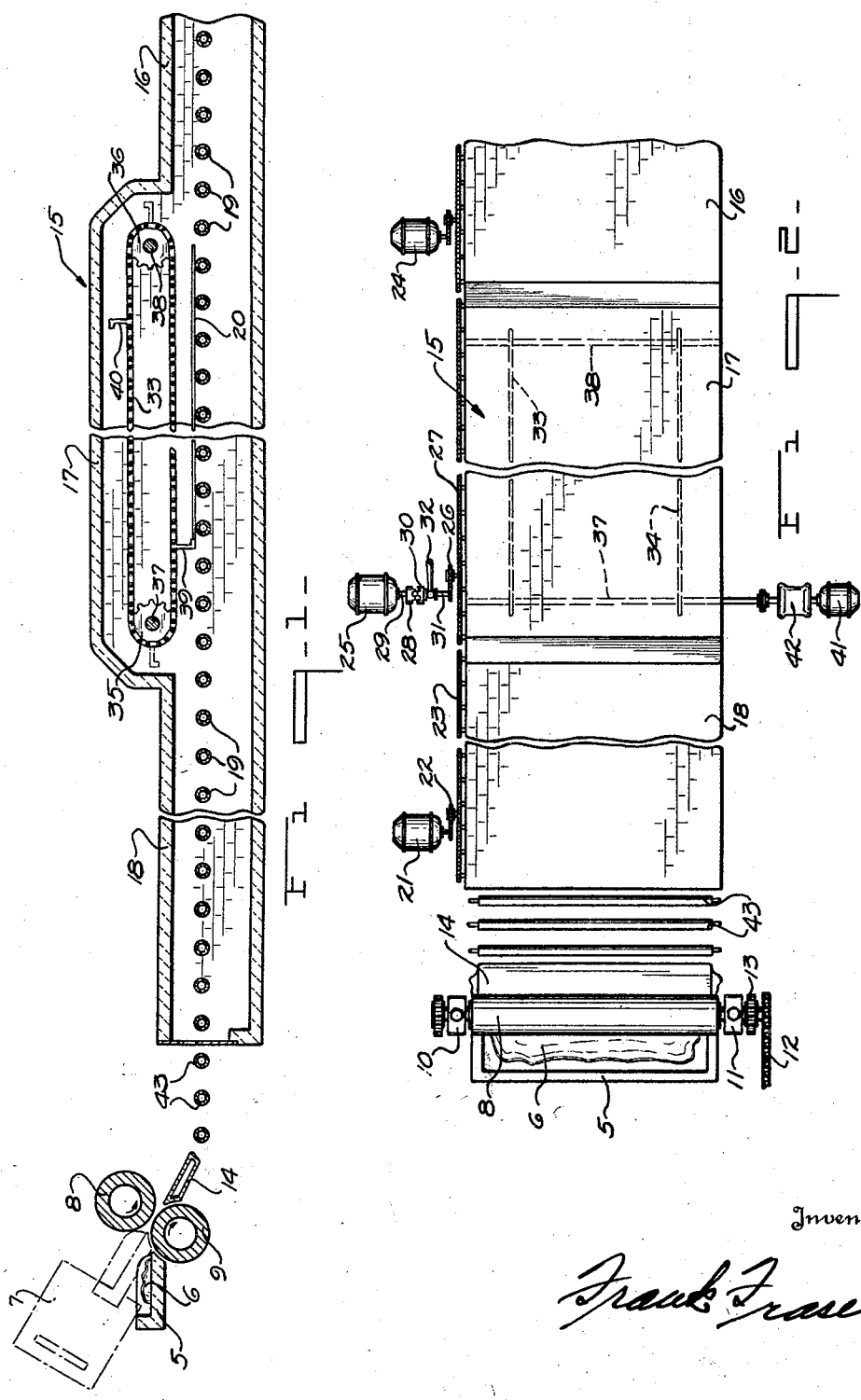
Inventor
Frank Fraser Patented Mar. 15, 1932

1,849,796

UNITED STATES PATENT OFFICE

FRANK FRASER, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed May 31, 1930. Serial No. 458,570.

The present invention relates to a process and apparatus for producing sheet or plate glass.

In the production of successive sheets of glass by an intermittent casting and rolling operation, it is desirable that the formation of the sheet be performed at a relatively high rate of speed as compared with the speed at which the sheet travels in annealing. The rapid formation of the sheet is desirable from both the standpoint of production and quality, while a relatively slower annealing speed is desirable in order to avoid the necessity of making the annealing apparatus of great length.

It is, therefore, an important object of this invention to provide a process and apparatus whereby successive sheets of glass may be intermittently formed at a relatively high rate of speed and subsequently annealed while traveling at a slower speed.

Another object of the invention resides in the provision of a process and apparatus for intermittently forming successive sheets of glass at a relatively high rate of speed and wherein the speed of travel of the sheets can be reduced to the desired annealing speed in a convenient and efficient manner and without the use of any complicated or expensive speed changing mechanism.

A further object of the invention is to provide, in combination with means for intermittently forming successive sheets of glass at a relatively high rate of speed, conveying means for carrying each sheet forwardly at such speed to a predetermined location and then either slowing down or completely stopping the forward travel thereof, together with means for then continuing the forward movement of the sheet at a relatively slower speed by the application of a pushing force thereto whereby to transfer it into an annealing zone.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus provided by the present invention, and Fig. 2 is a plan view thereof.

Referring to the drawings, 5 designates a receiver or support for receiving thereupon a mass or charge of molten glass 6 from a pot or other suitable receptacle 7. When the mass of molten glass 6 is initially deposited upon the receiver or support, the latter is maintained in a substantially horizontal position as indicated by the full lines, after which the support is tilted as shown by the broken lines to cause the molten glass to move downwardly between the forming rolls 8 and 9. The forming rolls are adapted to be rotated at a relatively high rate of speed in order to rapidly reduce the glass to sheet form, and these rolls are spaced apart to provide a sheet forming pass therebetween whereby a sheet of substantially predetermined and uniform thickness may be produced.

The forming rolls 8 and 9 are mounted upon shafts journaled at their opposite ends in the bracket members 10 and 11. One of the forming rolls is positively driven such as by means of a chain and sprocket drive or the like 12, while the other roll is driven from the first roll through intermeshing gears 13 carried by the roll shafts.

The glass sheet formed by the passage of the molten glass 6 between the forming rolls 8 and 9 is supported as it leaves said rolls upon an inclined chute or runway 14 and then subsequently deflected into the horizontal plane and carried forwardly into and through an annealing leer designated in its entirety by the numeral 15.

According to the present invention, the annealing leer 15 is composed of an annealing section or zone 16 which would be of considerable length, a transfer section or zone 17, and a receiving section or zone 18, said receiving, transfer and annealing sections being in alignment with one another and forming, in effect, a continuous tunnel leer. Disposed within the leer are a large number of horizontally aligned rolls 19 provided for supporting and conveying the glass sheet 20 therethrough. The rolls 19 in the receiving section 18 of the leer are adapted to be driven in unison at a constant speed substantially equal to the speed of formation of the sheet from a motor 21 through suitable reduction gearing 22 and a sprocket chain 23 trained about sprockets (not shown) carried by the ends of said rolls. The rolls 19 in the annealing section 16 are adapted to be driven in the same manner but at a constant relatively slower annealing speed from a motor 24.

The rolls 19 in the transfer section 17, however, are adapted to be positively driven at a speed equal to the speed of the rolls in receiving section 18 during the formation of the sheet and are then adapted to idle during the transfer of the sheet from said transfer section into the annealing section. In order to drive the rolls 19 in transfer section 17 in this manner, there is provided a motor 25 driving the rolls through reduction gearing 26 and a sprocket chain 27. Interposed between the motor 25 and gearing 26 is a clutch including the fixed clutch member 28 carried by the motor shaft 29 and a movable clutch member 30 slidably keyed to shaft 31, the movable clutch member being actuated by an operating handle 32. Thus, upon operation of the motor 25, and assuming the clutch members 28 and 30 are moved into engagement with one another, the rolls 19 in the transfer section 17 are adapted to be driven in unison with the rolls in the receiving section 18 and at the same rate of speed for receiving the sheet therefrom. However, when the clutch members 28 and 30 are disengaged from one another, the drive will be disconnected from the rolls and the said rolls permitted to run idle.

Mounted within the transfer section 17 above the rolls 19 therein is an overhead pusher mechanism including a pair of spaced endless belts or chains 33 and 34 trained about sprockets 35 and 36 mounted upon the transverse shafts 37 and 38. Carried by the chains or belts 33 and 34 are the pusher members 39 and 40 which are adapted to engage the rear edge of the sheet 20 when it is desired to push the same from the transfer section 17 into the annealing section 16. The driving of the endless chains may be effected from a motor 41 through suitable reduction gearing located in the casing 42. A plurality of idler rolls 43 may also be provided for supporting the sheet between the chute 14 and annealing leer.

In the operation of the apparatus above described, the endless chains 33 and 34 are first moved to a position where the pusher members will be arranged at the opposite ends of the transfer section out of the path of travel of the glass sheet, such as is shown by the broken lines in Fig. 1. A charge of molten glass 6 is then deposited upon the tiltable receiver 5 and passed downwardly between the sheet forming rolls 8 and 9 which serve to reduce the glass to a sheet 20 of substantially predetermined and uniform thickness. The forming rolls are driven in such a manner that the glass sheet will be formed at a relatively high rate of speed which may be, for example, from forty to sixty feet per minute. As the sheet leaves the forming rolls, it passes downwardly over the runway 14 and idler rolls 43 into the receiving section 18 of the leer, wherein it is supported by and carried along upon the rolls 19 therein at a speed substantially equal to its speed of formation in order to prevent warping and buckling thereof. During the formation of the sheet, the rolls 19 in the transfer section 17 are likewise being driven at the speed of formation of the sheet so that the said sheet is carried forwardly at forming speed until it is entirely received upon the rolls in the transfer section. When the sheet reaches this desired location, the clutch member 30 is moved to disengage clutch member 28, whereupon the driving means is disconnected from the rolls in the transfer section and the said rolls permitted to run idle. As soon as this is done, it will be apparent that the forward travel of the sheet will gradually be slowed down due to the weight thereof upon the rolls. When the sheet has been slowed down to the speed at which it is desired to convey the sheet in annealing, the endless chains 33 and 34 can be placed in operation to cause either the pushers 39 or 40 to engage the rear edge of the sheet and continue the forward travel thereof at such reduced speed to the end that the glass sheet will be fed into the annealing section at the same speed that the rolls therein are being driven and which may be from two to fifteen feet per minute.

Of course, if desired, the forward travel of the sheet can be completely stopped within the transfer section before actuating the pushers to engage the same, but if the advancing of the sheet is taken up by the pushers before the sheet has been permitted to come to a complete stop, there will be less danger of the sheet sagging between the rolls since it will be kept in constant forward motion. If the pushers 39 function to push the sheet from the transfer section into the leer, the pushers 40 will be brought into position to engage the next sheet and vice versa. The speed of the endless chains 33 and 34 is the same as the peripheral speed of the rolls within the annealing section so that the sheet will be delivered into the annealing section at the speed at which it is to travel therethrough. While it is preferred to place the sheet pushing means within the forward end of the leer it may, of course, be positioned in advance thereof, if desired.

From the above, it will be readily seen that the glass sheets or plates can be produced at a relatively high rate of speed and annealed while traveling at a relatively slower speed, the speed of forward travel of the sheet being reduced in an easy and convenient manner without the necessity of using any complicated or expensive speed changing mechanism associated with the rolls 19.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, consisting in first forming the sheet, carrying the sheet forwardly upon spaced movable surfaces to a predetermined location, continuing the forward travel of the sheet from said location by the application of a pushing force thereto, in delivering the sheet upon spaced movable surfaces, and in carrying the sheet upon said surfaces through an annealing zone.

2. The process of producing sheet glass, consisting in first forming the sheet, carrying the sheet forwardly upon spaced movable surfaces to a predetermined location, continuing the forward travel of the sheet from said location by the application of a pushing force applied to the rear edge thereof, in delivering the sheet upon spaced movable surfaces, and in carrying the sheet upon said surfaces through an annealing zone.

3. The process of producing sheet glass, consisting in first forming the sheet at a relatively high rate of speed, carrying the sheet forwardly upon conveying means to a predetermined location, reducing the forward speed of travel of the sheet while upon said conveying means, continuing the forward travel of the sheet at such reduced speed from said location by the application of a pushing force thereto, and in then annealing the sheet.

4. The process of producing sheet glass, consisting in first forming the sheet at a relatively high rate of speed, carrying the sheet forwardly at forming speed upon movable surfaces to a predetermined location, reducing the forward speed of travel of the sheet while upon said surfaces in such predetermined location, continuing the forward travel of the sheet at such reduced speed by the application of a pushing force applied to the rear edge thereof, and in then annealing the sheet.

5. The process of producing sheet glass, consisting in first forming the sheet at a relatively high rate of speed, carrying the sheet forwardly at forming speed upon movable surfaces to a predetermined location, stopping the forward travel of the sheet when it reaches such predetermined location, in continuing the forward travel of the sheet at a reduced speed by the application of a pushing force thereto, and in then annealing the sheet while traveling at such reduced speed.

6. In apparatus for the manufacture of sheet glass, means for forming the sheet, an annealing leer having a transfer zone and an annealing zone, means for receiving the sheet from the forming means and carrying it forwardly into the transfer zone, and means for pushing the sheet from said transfer zone into the annealing zone.

7. In apparatus for the manufacture of sheet glass, means for forming the sheet, an annealing leer having an annealing zone, means for receiving the sheet from the forming means and carrying it forwardly to a predetermined location, and means located above the sheet for pushing the same from such location into said annealing zone.

8. In apparatus for the manufacture of sheet glass, means for forming the sheet, an annealing leer having an annealing zone, means for receiving the sheet from the forming means and carrying it forwardly to a predetermined location, and means engaging the rear edge of the sheet for pushing the same from such location into said annealing zone.

9. In apparatus for the manufacture of sheet glass, means for forming the sheet, an annealing leer having an annealing zone, means for receiving the sheet from the forming means and carrying it forwardly to a predetermined location, and an overhead pusher for effecting transfer of the sheet from such location into said annealing zone.

10. In apparatus for the manufacture of sheet glass, means for forming the sheet, an annealing leer having an annealing zone and a transfer zone, conveying means arranged within said zones, means for driving the conveying means within the annealing zone at a constant speed, means for driving the conveying means in the transfer zone at a predetermined speed, means for disconnecting the drive to said last named conveying means thereby causing said means to run idle, and means located above the conveying means in the transfer zone for pushing the sheet from the conveying means therein onto the conveying means in said annealing zone.

11. In apparatus for the manufacture of sheet glass, means for forming the sheet, an annealing leer having a transfer zone and an annealing zone, means for receiving the sheet from the forming means and carrying it forwardly into the transfer zone, and means arranged within said transfer zone for pushing the sheet therefrom into said annealing zone.

12. In apparatus for the manufacture of sheet glass, means for forming the sheet, an annealing leer having a transfer zone and an annealing zone, means for receiving the sheet from the forming means and carrying it forwardly into the transfer zone, and means arranged within the transfer zone above the sheet and engaging the rear edge thereof for pushing said sheet from said transfer zone into said annealing zone.

Signed at Toledo, in the county of Lucas and State of Ohio, this 29th day of May, 1930.

FRANK FRASER.